F. J. WOOD.
BAND CUTTER AND FEEDER.
APPLICATION FILED JUNE 1, 1909.
1,044,329.
Patented Nov. 12, 1912.
4 SHEETS—SHEET 1.
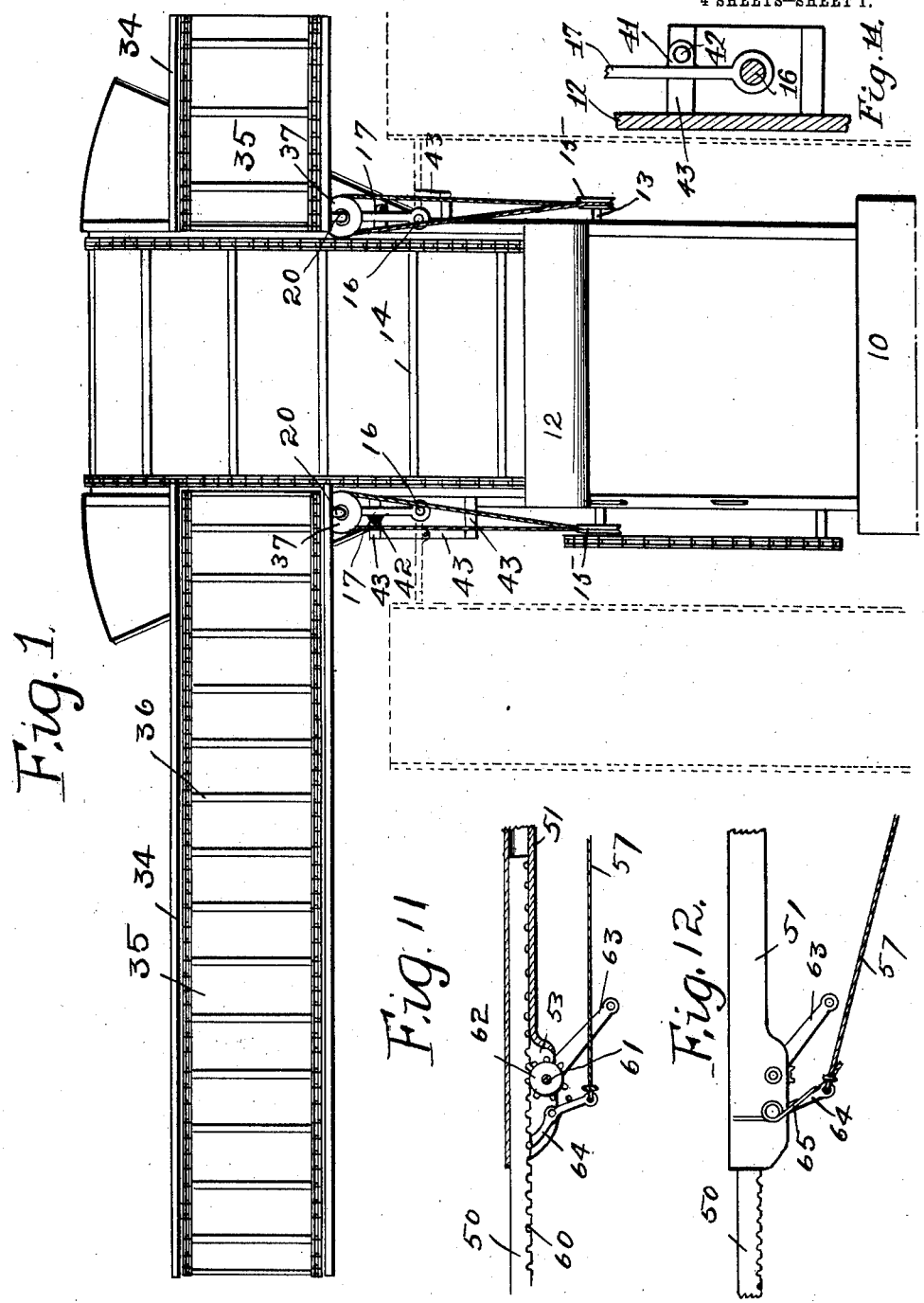

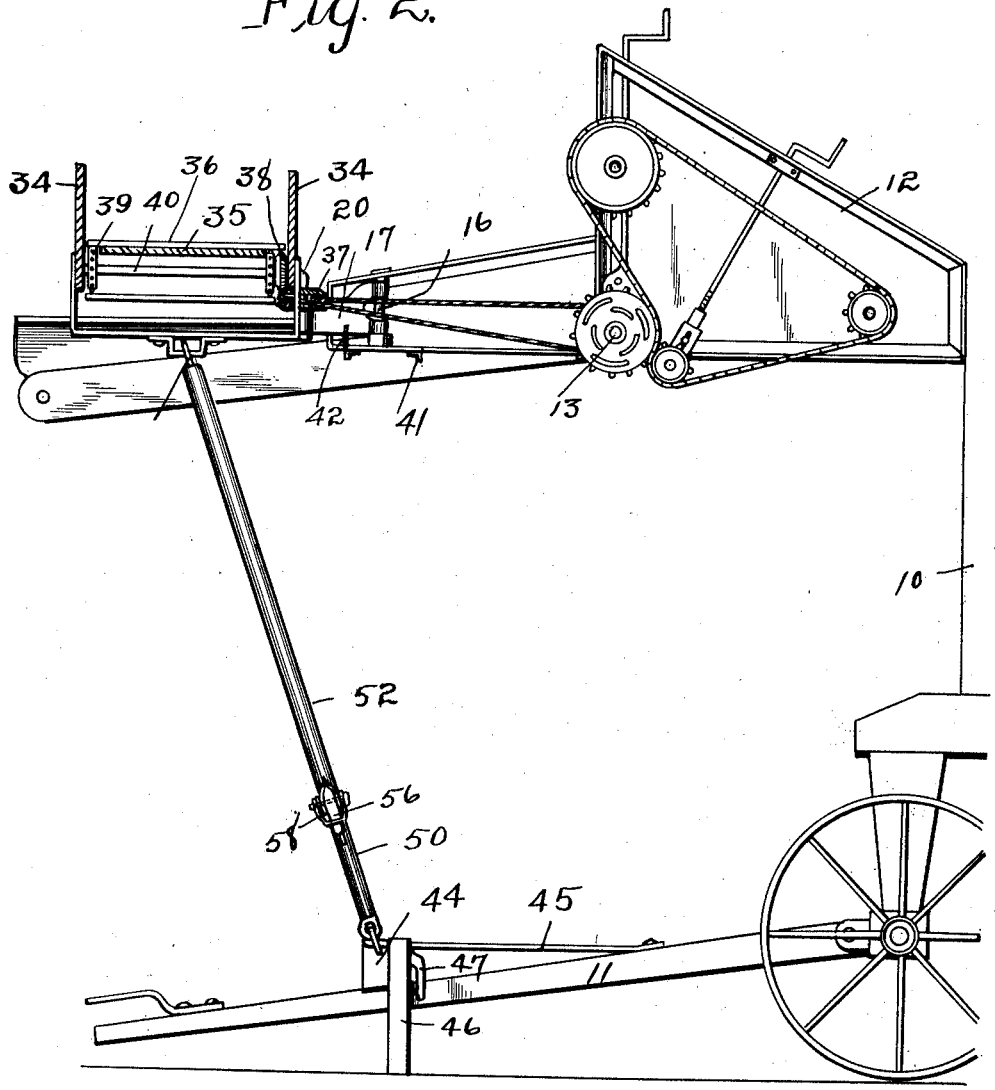

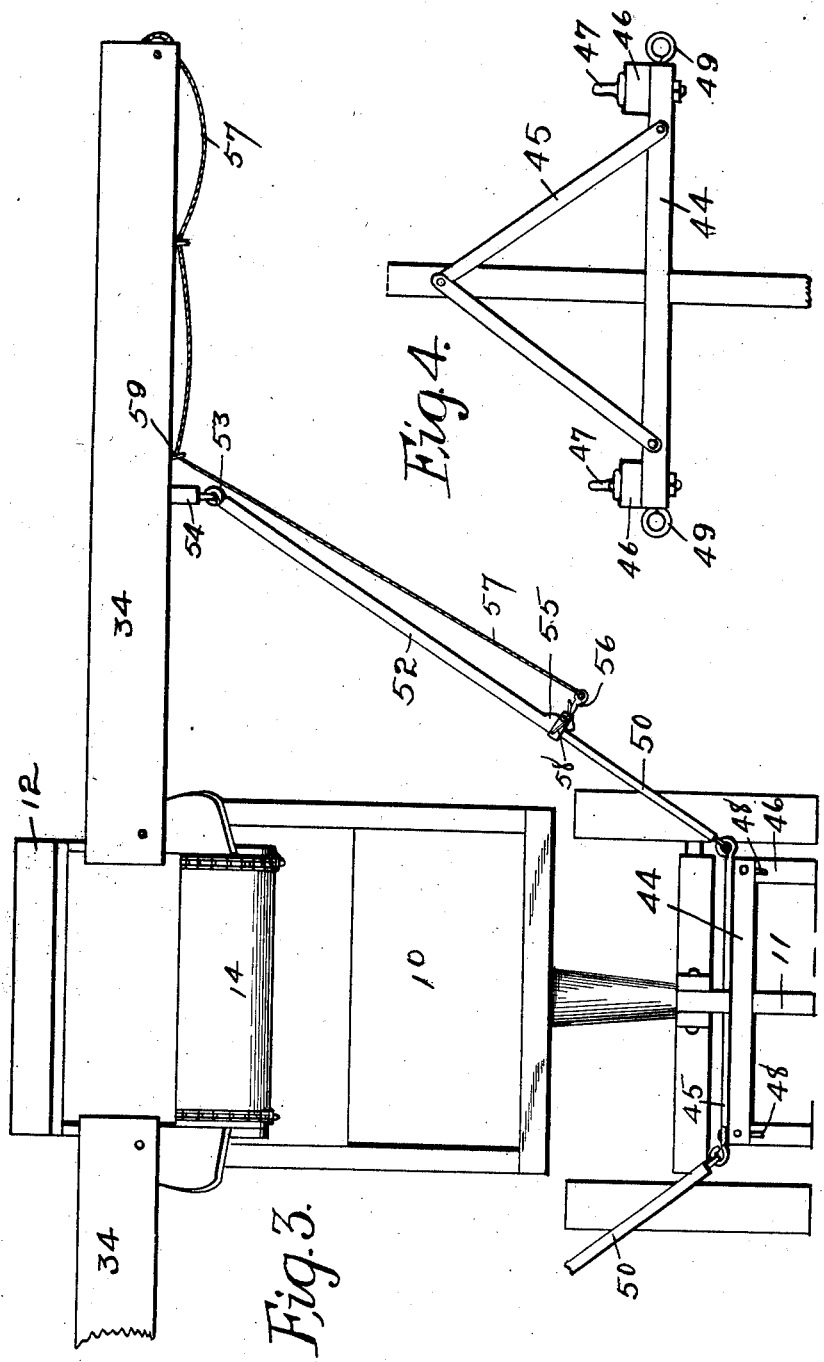

F. J. WOOD.
BAND CUTTER AND FEEDER.
APPLICATION FILED JUNE 1, 1909.
1,044,329.
Patented Nov. 12, 1912.
4 SHEETS—SHEET 4.
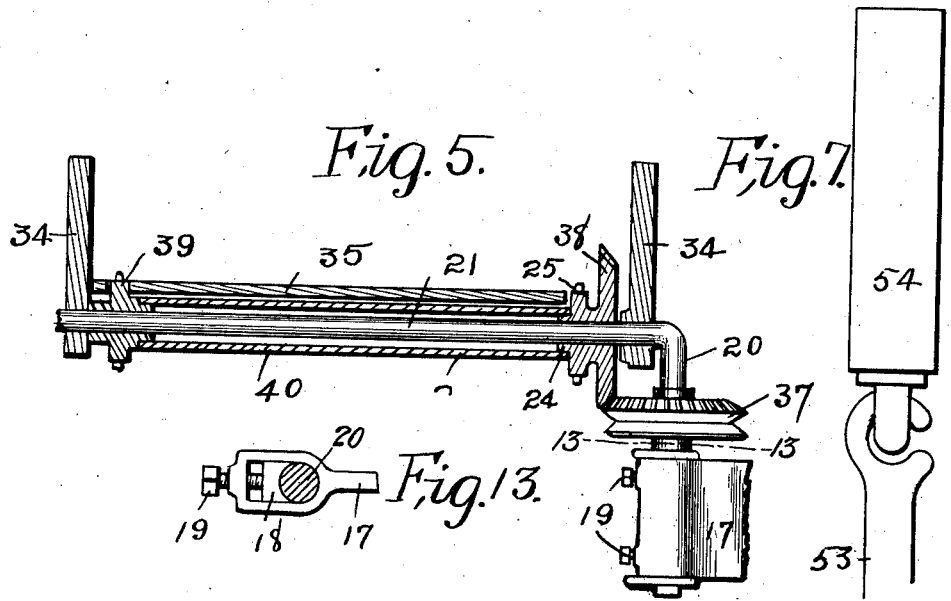
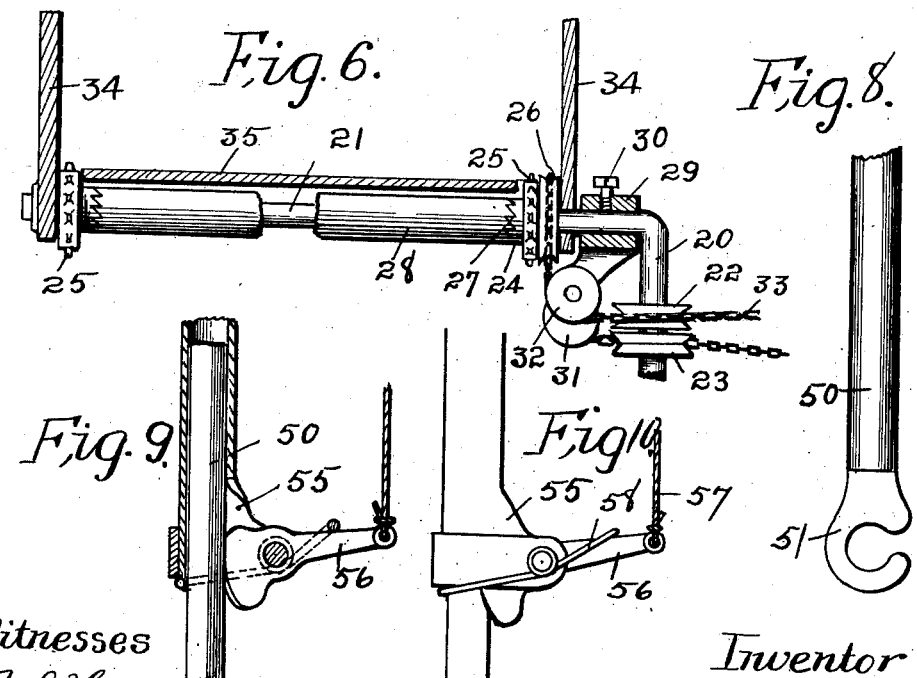
Witnesses
A. G. Hague
W. A. Loftus.
Inventor
F. J. Wood
by Orwig & Laul, Attys

UNITED STATES PATENT OFFICE.

FRANZ J. WOOD, OF DES MOINES, IOWA, ASSIGNOR TO WOOD BROTHERS THRESHER COMPANY, OF DES MOINES, IOWA, A CORPORATION OF IOWA.

BAND-CUTTER AND FEEDER.

1,044,329.

Specification of Letters Patent.

Patented Nov. 12, 1912.

Application filed June 1, 1909. Serial No. 499,301.

*To all whom it may concern:*

Be it known that I, FRANZ J. WOOD, a citizen of the United States, residing at Des Moines, in the county of Polk and State of Iowa, have invented a certain new and useful Band-Cutter and Feeder, of which the following is a specification.

My invention relates to that class of band cutters and feeders in which there is a main frame with a conveyer in it and also two auxiliary frames extended laterally from the main frame for the purpose of conveying bundles of grain from points spaced apart from the sides of the main frame.

My object is to provide simple, durable, and inexpensive means whereby the lateral feeder frames may be adjusted both vertically and horizontally throughout a comparatively wide range of movement, and also to provide means whereby the lateral frames, when moved forwardly to position adjacent to the side of the main frame, will also have their pivoted ends moved outwardly away from the main frame so that they may lie in parallel positions relative to the main frame and not interfere with the belt wheels and other attachments on the sides of the main frame.

A further object is to provide means of simple, durable, and inexpensive construction for driving the conveyers in both of the lateral frames when they are in any position of their adjustment, except the folded position.

A further object is to provide improved means for adjustably supporting the outer ends of the lateral frames, which adjustment may be accomplished by an operator either standing on the ground adjacent to the main frame or standing in an elevated position as, for instance, upon a grain stack adjacent to the outer end of the lateral frame.

My invention consists in the construction, arrangement, and combination of the various parts of the device, whereby the objects contemplated are attained, as hereinafter more fully set forth, pointed out in my claims, and illustrated in the accompanying drawings, in which—

Figure 1 shows a top or plan view of a part of a threshing machine, a main band cutter and feeder frame connected therewith, and two lateral conveyer frames in position for use. The dotted lines in said figure show the positions of the lateral frames when folded adjacent to the main frame. Fig. 2 shows a side elevation of the same, the lateral frame being shown in section. Fig. 3 shows an end elevation of same taken from the receiving end of the main band cutter and feeder frame. Fig. 4 shows a detail plan view of the tongue of the threshing machine to illustrate the support for the adjustable legs of the lateral frames. Fig. 5 shows an enlarged, detail sectional view illustrating a modified form of means for driving the conveyers of the lateral frames. Fig. 6 shows a similar view illustrating my preferred form for driving the conveyers of the lateral frames. Fig. 7 shows an enlarged, detail view illustrating the means for connecting the adjustable leg with one of the lateral conveyers. Fig. 8 shows an enlarged, detail view illustrating the hook on the adjustable leg for connecting it with the support. Fig. 9 shows an enlarged, detail sectional view illustrating the means for adjustably connecting the two parts of the adjustable leg. Fig. 10 shows a side view of same. Fig. 11 shows a detail, sectional view illustrating a modified form of means for adjustably connecting the parts of the supporting leg. Fig. 12 shows a side view of same. Fig. 13 shows a top or plan view of the outer end of the pivoted supporting arm of the lateral frame as it would appear looking downwardly from the dotted line 13 in Fig. 5. Fig. 14 shows an enlarged, detail, sectional view illustrating the pin for engaging the swinging bracket to hold the bracket to position adjacent to the main frame.

Referring to the accompanying drawings, I have used the reference numeral 10 to indicate that portion of the threshing machine shown; 11 indicates a tongue connected therewith. Attached to the threshing machine frame is the main frame 12 of the band cutter and feeder. The particular construction of the band cutter and feeder frame forms of itself no part of my present invention and, therefore, is not illustrated and described herein in detail.

The band cutter and feeder frame is provided with a shaft 13 which shaft drives the conveyer 14 of the band cutter and feeder. The lateral conveyers, hereinafter described, are driven in unison with the conveyer 14 and I have, therefore, provided for connecting them with the main conveyer shaft 13. Fixed to the main conveyer shaft 13 are the grooved pulleys 15, one on each end. The conveyers in the lateral frames are driven from these pulleys. The two lateral conveyers are both alike and both operate in the same manner and, therefore, in the following description but one will be referred to.

Mounted on the side of the main conveyer frame is a vertical pin 16 and pivotally supported on this pin is an arm 17 capable of swinging from a rearwardly extended position parallel with the main frame to position at right-angles to the main frame, as shown by dotted lines in Fig. 1. The outer end of the arm 17 is provided with a vertical slot (see Fig. 13), and mounted in said slot is a block 18 curved at one side, said block being designed to engage an upright supporting rod and to be firmly held against it by means of the set-screws 19. Mounted in the outer end of the arm 17 is an upright rod 20 which is firmly clamped in the opening in the arm 17 by means of the set-screws 19 and block 18, as clearly shown in Fig. 13. At the upper end of the arm 20 is a horizontal extension 21. Rotatably mounted upon the upright portion of the arm 20 in the preferred form are two rotatable grooved pulleys 22 and 23. Rotatably mounted upon the adjacent end portion of the horizontal part of the arm 20 is a sleeve 24 having teeth at one end and also having a sprocket wheel 25 fixed to it. A grooved pulley 26 is also fixed to this sleeve. At the other end of the part 21 is a similar sleeve 24 having a sprocket wheel 25 thereon, the sleeve being also provided with teeth. For convenience in assembling the parts and in order to connect the two sleeves 24 so that they will rotate in unison I provide a sleeve 28 on the part 21, which sleeve has teeth 27 at its ends to engage with the teeth on the sleeves 24. The operation of these parts would be the same if the sleeves 24 and 28 were all formed complete in one piece but it is much more convenient to assemble these parts in the manner just described. Fixed to the part 21, adjacent to the upright part 20, is a bracket 29 held in position by a set-screw 30 and provided with two grooved pulleys 31 and 32. A belt or chain 33 is provided and it is passed around the grooved pulley 15, then in front of the pulley 22, then under the pulley 32, then over the pulley 26, then under the pulley 31, and then around the side of the pulley 23. By this arrangement, it is obvious that when the pulley 15 is rotated, the sprocket wheels 25 will also be rotated in unison. It is obvious, further, that the extension 21 may freely swing in a horizontal plane on the arm 17 without affecting the means for driving the sprocket wheels 25. The frame of the lateral conveyer comprises sides 34 and the bottom 35, and an endless conveyer 36 is passed around the sprocket wheels 25 and over the bottom 35 so that said conveyer will be driven by said sprocket wheels 25. The frame of the lateral conveyer may freely swing vertically on the arm 21 without affecting the operation of the conveyer 36.

In the modified form illustrated in Fig. 5, I have shown a combination grooved pulley and beveled gear wheel 37 rotatably mounted upon the part 20, and a beveled gear wheel 38 on the sleeve 24, the said beveled gear wheels being in mesh with each other. In this form of the invention, the belt or chain 33 is passed around the pulley 37, and when rotated, the beveled gear wheel 38 will be rotated by the beveled gear wheel 37. On the outer end of the arm 21 is a second sprocket wheel 39 connected with the sleeve 24 by the sleeve 40 so that both sprocket wheels 38 and 39 will be driven in unison to drive the conveyer.

By means of the construction described, it is obvious that the frame of the lateral conveyer will be firmly supported at its inner end upon the extension 21 and that the conveyer of the lateral frame will be driven in unison with the conveyer in the main frame and, further, that the lateral frame may be moved either vertically or horizontally without affecting the operation of the conveyer. It is also obvious that when it is desired to fold the lateral conveyers for purposes of transportation, the arms 17 may be swung outwardly at right angles to the main frame in position spaced apart from the side of the main frame so that the lateral conveyer frame may lie substantially parallel with the main frame and not interfere with the pulleys and other machinery at the side of the main frame and at the side of the threshing machine.

In order to prevent the arm 17 from swinging outwardly away from the main frame when in use, I provide a lug 41 (see Fig. 14) at the side of the arm 17, said lug having an opening therein designed to receive a pin 42 to extend through the lug into a bracket 43 on the main frame to thereby hold the arm 17 in position parallel with the main frame until said pin is removed.

In order to adjustably support the outer end of the lateral frame, I have provided the following mechanism: Mounted on the tongue 11 is a cross piece 44 held in position by means of the braces 45 and having legs 46 at its ends adjustably connected therewith by means of the bolts 47 in the slots 48. At the ends of this cross piece 44 are the loops 49 designed to receive the supporting leg. The supporting leg is formed of two parts, the part 50 being provided with a hook 51 in its lower end to engage the loop 49, and the part 52 being formed hollow to receive the part 50 to provide a telescopic connection. At the upper end of the part 52 is a hook 53 designed to enter an eye 54 fixed to the lateral frame. At the lower end of the part 52 is a lateral extension 55 in which a cam lever 56 is pivoted, the inner end of said cam lever being designed to engage the part 50, as clearly shown in Fig. 9. Attached to the outer end of the lever 56 is a rope 57, and a spring 58 is provided to normally hold the outer end of the lever 56 downwardly so that the cam shaped inner end of said lever will normally be forced against the part 50. This rope 57 is extended upwardly and passed through a number of guide loops 59 on the lateral conveyer frame and it extends to the outer end of said frame. In practical operation of this part of the device and assuming the parts to be in the position shown in Fig. 3, it is obvious that the outer end of the lateral conveyer frame is firmly supported in the position shown. Assuming that it is desired to elevate the outer end of the lateral conveyer frame, and assuming, further, that the operator is standing on the ground, he then grasps the lever 56 and elevates it against the pressure of the spring 58, and then he grasps the upper portion 52 of the leg and thereby raises the lateral conveyer frame to the desired position. He then releases the lever 56, whereupon the spring 58 will cause said lever to engage the lower part 50 of the leg. Assuming, further, that the operator is at the top of a grain stack adjacent to the outer end of the lateral conveyer frame, the position of the lateral conveyer frame may be readily and easily adjusted by him as follows: If it is desired to elevate the frame, he first pulls upon the rope 57 to release the cam lever 56 and then grasps the outer end of the conveyer frame and elevates it to the desired position and then releases the rope 57. By this arrangement, several advantageous results are attained. In the first place, all of the mechanism for supporting the lateral conveyer frame is below the frame, and hence will not interfere with the placing of bundles of grain in the lateral conveyer at any point. Furthermore, the lateral conveyer frame may be adjusted either by an operator stationed adjacent to the outer end of the lateral conveyer frame or by an operator on the ground. By having the legs 46 of the support adjustably mounted relative to the cross piece 44, the device may be made to conform to the contour of the ground, and the said cross piece will set flat on the ground, and firmly support the legs of the lateral conveyer frames.

In the modified form shown in Figs. 11 and 12, I have illustrated a means for adjustably supporting the upper and lower members of the supporting leg as follows: The lower leg member 50 is provided with a series of notches or holes 60 in one side, and the upper leg member 51 has a shaft 61 mounted in the lug 53. On this shaft is a pinion 62 designed to engage and co-act with the notches 60, and a crank 63 is also fixed to said shaft. By this means, the upper leg section 51 may be either raised or lowered relative to the lower one. In order to hold said parts in any position relative to each other to which they may be adjusted, I have provided a pawl 64 designed to enter said notches 60 and having the rope or cable 57 attached thereto. A spring 65 is provided for holding said pawl in position in engagement with the part 50. By this arrangement, it is obvious that the adjustment of the lateral conveyer frame may be readily made by an operator stationed at the outer end of the lateral conveyer frame because if the rope 47 is elevated, then the outer end of the lateral frame may be raised or lowered and the parts of the supporting leg will slide relative to each other, then when the rope is released, the parts will be connected. It may also be readily and easily adjusted by an operator on the ground who need only raise the pawl 64 and then turn the crank 63.

I claim as my invention.

1. In a device of the class described, the combination of a main frame, a lateral conveyer frame, an upright arm pivotally mounted on the main frame to swing in a horizontal plane, a horizontal extension at the upper end of said arm having said lateral frame pivotally connected to it to swing in a vertical plane, a sleeve rotatably mounted on the horizontal portion of the arm, sprocket wheels connected with said sleeve, a conveyer carried by the lateral frame and arranged to be driven by said sprocket wheels, a grooved pulley connected with one of said sprocket wheels, two grooved pulleys on the upright portion of said arm, and two guide pulleys supported between the pulley on the horizontal portion and the pulleys on the upright portion, and a belt passed around said pulleys for driving the conveyer when the lateral frame is in various positions of its adjustment.

2. A device of the class described, comprising a threshing machine having a tongue, a band cutter and feeder frame connected with the threshing machine, a lateral conveyer frame pivotally connected to the band cutter and feeder frame to swing vertically, a two-part supporting leg connected to the lateral conveyer frame, a cross piece mounted on the threshing machine tongue, supporting legs at the ends thereof, means for connecting the supporting leg with one end of said cross piece, and means for adjustably securing the parts of the supporting leg relative to each other.

3. A device of the class described, comprising a threshing machine having a tongue, a band cutter and feeder frame connected with the threshing machine, a lateral conveyer frame pivotally connected to the band cutter and feeder frame to swing vertically, a two-part supporting leg connected to the lateral conveyer frame, a cross piece mounted on the threshing machine tongue, vertically adjustable supporting legs at the ends thereof, means for connecting the supporting leg with one end of said cross piece, and means for adjustably securing the parts of the supporting leg relative to each other.

FRANZ J. WOOD.

Witnesses:
 MILDRED B. GOLDIZEN,
 NELLIE M. TAYLOR.

Copies of this patent may be obtained for five cents each, by addressing the "Commissioner of Patents, Washington, D. C."